United States Patent [19]

Kuhn et al.

[11] 4,003,846
[45] Jan. 18, 1977

[54] PROCESS FOR THE ENCAPSULATING OF SUBSTANCES IMMISCIBLE WITH WATER

[75] Inventors: Martin Kuhn, Birsfelden; Melvin Harris, Dornach, both of Switzerland

[73] Assignee: Ciba-Geigy Corporation, Ardsley, N.Y.

[22] Filed: Nov. 13, 1974

[21] Appl. No.: 523,634

[30] Foreign Application Priority Data

Nov. 16, 1973 Switzerland .................... 16174/73

[52] U.S. Cl. .................................... 252/316; 8/79; 424/19; 424/33; 424/330; 424/340; 427/151; 427/152; 427/340
[51] Int. Cl.² ........................................ B01J 13/02
[58] Field of Search ....... 252/316; 260/117, 561 R, 260/583 P; 427/340

[56] References Cited

UNITED STATES PATENTS

| | | | |
|---|---|---|---|
| 2,886,445 | 5/1959 | Rosenthal et al. | 426/89 X |
| 3,226,234 | 12/1965 | Himmelmann et al. | 260/117 X |
| 3,328,257 | 6/1967 | Vrancken et al. | 252/316 X |
| 3,432,327 | 3/1969 | Kan et al. | 252/316 X |
| 3,449,228 | 6/1969 | Yurcheshen et al. | 204/181 |

*Primary Examiner*—Richard D. Lovering
*Attorney, Agent, or Firm*—Harry Falber

[57] ABSTRACT

A process for the encapsulating of substances immiscible with water by dispersing the substance to be encapsulated in a distribution medium in the presence of a hydrate or bisulphite adduct of a polyacrolein or acrolein copolymer and reacting said hydrate or bisulphite adduct with a water-soluble, polyfunctional, monomeric or polymeric hydrophilic compound and, optionally, additionally with a curing agent or an aminoplast precondensate to form an insoluble capsule.

5 Claims, No Drawings

PROCESS FOR THE ENCAPSULATING OF SUBSTANCES IMMISCIBLE WITH WATER

The present invention relates to a process for the encapsulating of substances immiscible with water.

The process is one in which the substance to be encapsulated is dispersed in a distribution medium in the presence of an aqueous solution of a polyacrolein or acrolein copolymer present as hydrate or bisulphite adduct, which aqueous solution is capable of forming a compound insoluble in the distribution medium; and the hydrate or the bisulphite adduct is reacted in the resulting dispersion with a water-soluble, polyfunctional, monomeric or polymeric hydrophilic compound and, optionally, additionally with a curing agent or an aminoplast precondensate to form an insoluble capsule material.

A preferred embodiment of the process according to the invention comprises a process in which the substance to be encapsulated is dispersed in the distribution medium in the presence of an aqueous solution of a bisulphite adduct of a polyacrolein or acrolein copolymer; and the bisulphite adduct in the resulting dispersion is reacted with a water-soluble, polyfunctional, monomeric or polymeric hydrophilic compound and, optionally, additionally with a carbonyl compound or an aminoplast precondensate to form an insoluble capsule material.

The present invention makes use of a two-phase system consisting of a liquid external phase, which is designated as the distribution medium, and a substance to be encapsulated, which is to be finely dispersed and which is immiscible with the external phase, which substance constitutes the internal phase, and a polyacrolein-bisulphite adduct or polyacrolein hydrate which is soluble in the external phase and which serves to create and maintain the state of fine dispersion.

The distribution medium used is preferably an aqueous medium, for example, water, in which the polyacrolein component and, optionally, further substances are dissolved.

Suitable substances for fine dispersion in the process of the invention are solid, liquid or gaseous substances, and also solutions of substances, which are insoluble in water and which do not react with water and with the substances forming the wall of the capsule.

Solids must become dispersed in the presence of the polyacrolein component and, optionally, they are to be pulverised by grinding to such a degree that a stable dispersion can be obtained.

As dispersible solids, it is possible to use the widest range of active substances; for example: pharmaceutical products including growth hormones and vitamines, cosmetics, pigments, dyestuffs, colour-formers, optical brighteners, textile auxiliaries, textile protective agents or finishing agents, fillers, waxes, fertilisers, agents regulating plant growth, pest-control agents, such as insecticides, fungicides, antimicrobics, biocidal agents, such as, e.g., agents exterminating ticks, also synthetic polymers usable as adhesives, perfumes and aromatics, photochemicals, water-insoluble metal oxides, e.g. magnetic iron oxide, water-insoluble salts, etc..

If the substance to be encapsulated, i.e. the internal phase, is a liquid, by which is also meant solutions of substances, then it (or they) must not, as already mentioned, be soluble in, or at least not miscible with, the distribution medium, i.e. the external phase. It can in general be said that the external and the internal phase are to be so chosen that no appreciable amounts of the one phase are dissolved by the other and no undesirable chemical reactions occur.

Suitable substances to be emulsified can be undiluted liquid active substances or solutions of liquid or solid active substances in suitable organic solvents. Preference is given in general to liquid substances which have a high boiling point or are difficultly volatile. The process enables however also low-boiling liquids to be encapsulated.

Examples of liquid substances are petroleum fractions such as kerosene and naphtha, straight-chain and branched-chain, optionally halogenated paraffins, aromatic, optionally halogenated hydrocarbons such as benzene and alkylbenzenes, e.g. toluene, xylene, chlorobenzene, dichlorobenzene, trichlorobenzene benzyl chloride, benzal chloride and analogous bromine compounds, alkylated di- and polyphenyls, hydrogenated terphenyls such as hexa- and dodecahydro-terphenyl, halogenated di- and polyphenyls such as chlorinated diphenyls and polyphenyls, diphenyl-diphenyl-ether mixtures such as diphenyl-diphenyl oxide mixtures, methylenediphenyl, alkyl- and hydronaphthalenes, phosphoric acid esters such as tributyl- and tricresyl-phosphate, alkylated, optionally halogenated cycloaliphates, esters of higher fatty acids such as ethyl myristate, ethyl oleate, ethyl palmitate, vegetable oils such as maize oil, soya bean oil, olive oil, coconut oil, palm oil, castor oil, peanut oil, rape oil, sunflower oil, hemp seed oil, linseed oil, cottonseed oil, animal oils such as fish and whale oil, mineral oils, silicone oils or sperm oil.

It is particularly advantageous to use as the polyacrolein constituent the solutions of polyacrolein in aqueous sulphurous acid or in aqueous bisulphite solution, especially sodium bisulphite solution.

The polyacrolein-bisulphite solutions used in the process according to the invention are advantageously prepared by the introduction of sulphur dioxide into aqueous suspensions of polyacrolein, preferably at room temperature, for 1 to 12 hours. For the preparation of emulsions, however, also polyacrolein-bisulphite solutions prepared by dissolving of polyacrolein in aqueous sodium hydrogen sulphite solution are suitable. In the bisulphite solutions of polyacroleins, the sulphurous acid adduct is, as a rule, in equilibrium with the hydrated form of the polyacrolein.

If in the case of reactions with sensitive hydrophilic compounds the presence of sulphurous acid causes interference, then the sulphurous acid can be removed by dialysis, ion exchange or oxidation with the air. The polyacrolein is not in this case converted into the insoluble state but remains as reactive stable polyacrolein-hydrate in solution.

Suitable as polyacrolein is, for example, the disacryl known from the article of J. Redtenbacher, Liebigs Ann, Chem. 47 (1843) 113, a polymerisate having a mean molecular weight of between 60,000 and 300,000, formed by the action of light, heat or catalytic amounts of oxygen on acrolein rendered unstable. In particular, however, there are used radical polymerisates of acrolein having mean molecular weights of between 500 and 300,000 preferably between 15,000 and 100,000, which are obtained especially by redox-polymerisation of acrolein in aqueous medium, depending on the desired molecular weight in the absence or presence of emulsifiers, such as sodium oleate, polyethylene oxide, the sodium salt of polyvinylsulphonic acid or polyacrolein bisulphite.

In the absence of emulsifiers, it is possible to obtain, depending on reaction conditions, mean molecular weights of between 500 and 100,000 while in the presence of the above-mentioned emulsifiers, mean molecular weights of between 100,000 and 300,000 are obtainable.

In the process according to the invention, it is also possible to use copolymers of acrolein with other copolymerisable vinyl compounds. Suitable comonomers are, for example, acrylamide, vinyl acetate, styrene and acrylonitrile.

The ratio of constituents in these copolymers can be freely chosen, provided that the copolymers are still soluble in aqueous sulphurous acid or in alkali bisulphite solution with the formation of adducts.

Preferred copolymers, which are obtainable by copolymerisation of acrolein with the mentioned comonomers with redox systems in an aqueous medium, have, e.g. the following compositions:

63 mol-% of acrolein / 37 mol-% of acrylamide,
80 mol-% of acrolein / 20 mol-% of vinyl acetate,
53 mol-% of acrolein / 47 mol-% of acrylonitrile,
66 mol-% of acrolein / 34 mol-% of acrylonitrile.

The carbonyl-group content of the polyacrolein-copolymer solutions or acrolein-copolymer solutions usable according to the invention is 20 to 100 mol-%, preferably 50 to 80 mol-%, relative to the dissolved polyacrolein.

Suitable monomeric or polymeric hydrophilic reagents are, in principle, polyfunctional compounds which can be reacted in aqueous solution with the carbonyl groups of the polyacrolein constituent, and which contain as reactive groups preferably amino, hydroxyl or mercapto groups, especially, however, primary and/or secondary amino groups.

The expression "reactive amino, hydroxyl and mercapto group", in the way it is used here, denotes every amino, hydroxyl or mercaptan group in the hydrophilic compounds which can participate in the reaction with the polyacrolein constituent. The amino group can, for example, also be a constituent of a hydrazine grouping, carboxylic acid amide grouping, sulphonic acid amide grouping, amidine grouping, urea grouping or carboxylic acid hydrazide grouping or sulphonic acid hydrazide grouping. In this connection, monomeric polyamides containing at least two, preferably 2 to 5, functional amino groups have proved satisfactory. Those suitable are, for example, alkylenepolyamines, cycloalkylenepolyamines, arylenepolyamines or heterocyclic polyamines of which the amine functions are primary or secondary, or which can be contained in a heterocyclic nucleus, or mixtures thereof. If these polyamines are not water-soluble, it is possible to use their ammonium salts, e.g. hydrochlorides. In the case of alkylenepolyamines, these advantageously have 2 to 5 amino groups, which are separated by straight-chain or branched-chain alkylene groups containing 2 to 6 carbon atoms, preferably 2 to 4 carbon atoms. Applicable polyfunctional alkyleneamines are, for example, ethylenediamine, propylenediamine, butylenediamine, pentylenediamine, hexamethylenediamine, diethylenetriamine, triethylenetetramine, 1,2-propylenediamine, dipropylenetriamine, tripropylenetetramine, dihydroxydipropylenetriamine, dibutylenetriamine, tributylenetetramine, tetrabutylenepentamine, dipentylenetriamine, tripentylenetetramine, tetrapentylenepentamine, dihexamethylenetriamine, trihexamethylenetetramine, tetrahexamethylenepentamine as well as alkylene oxide adducts with di- or higher-functional alkyleneamines, such as, e.g. adducts of 1–100 mols of ethylene oxide or propylene oxide with diethylenetriamine or triethylenetetramine. It is likewise possible to use reaction products of epichlorohydrin with di- or higher-functional alkyleneamines, such as, e.g. reaction products of epichlorohydrin with triethylenetetramine in the molar ratio of 1:1 to 5:1.

To be mentioned as heterocyclic hydrophilic polyamines are, e.g. piperazine, 1,4-bis-(3-aminopropyl)-piperazine, 2-oxo-1,3-hexahydropyrimidine-diethylamine.

Suitable aromatic and alicyclic hydrophilic polyamines are, for example, o-phenylenediamine, 4,4'-diaminodiphenylamine, 4,4'-diamino-dicyclohexylmethane, 2,2'-bis-(4-aminocyclohexyl)-propane or 4,4'-diamino-dicyclohexylamine.

Further polyfunctional monomeric hydrophilic compounds reacting with carbonyl groups are aqueous ammonia, hydrazine and reaction products derived therefrom and containing at least two such groups, as well as water-soluble aminoplast-forming agents and aminoplast precondensates.

By aminoplast-forming agents are meant methylolatable nitrogen compounds such as, e.g. urea compounds or thiourea compounds, 1,3,5-aminotriazines or cyanuric acid; and by aminoplast precondensates are meant addition products of formaldehyde with methylolatable nitrogen compounds.

Suitable urea compounds and thiourea compounds are, for example, urea, thiourea, substituted ureas such as alkylureas or arylureas, alkyleneureas and alkylenediureas, such as ethyleneurea, propyleneurea, dihydroxyethyleneurea, hydroxypropyleneurea and acetylenediurea, also dicyanodiamide, dicyanodiamidine, urones and hexahydropyrimidones.

1,3,5-Aminotriazines that may be mentioned are, e.g.: melamine and N-substituted melamines such as N-butylmelamine, N-trihalomethylmelamines, triazones, ammeline, guanamines such as, e.g. benzoguanamine, acetoguanamines, diguanamines as well as guanidines, which can be put into a water-soluble form by conversion into corresponding ammonium salts.

Suitable aminoplast precondensates are preferably the methylol compounds of the mentioned ureas and 1,3,5-aminotriazines. To be specially emphasised among these compounds are, in particular, N-methylolureas and N-methylolmelamines. It is also possible to use partial ethers of such methylol compounds, e.g. with alkanols having 1 to 22 carbon atoms, such as methanol, ethanol, n-propanol or n-octadecanol.

Polyfunctional, polymeric hydrophilic compounds are, for example, water-soluble basic aminoplasts such as formaldehyde/dicyanodiamide condensation products. Advantageous results are obtained with, in particular, condensation products from formaldehyde, dicyanodiamide and urea, in the absence or presence of a polyfunctional alkyleneamine such as, e.g. one of the above-mentioned alkylenepolyamines. Suitable basic aminoplasts are, in particular, formaldehyde/-dicyanodiamide/diethylenetriamine condensation products or formaldehyde/urea/diethylenetriamine condensation products or formaldehyde/urea/- dicyanodiamide/diethylenetriamine condensation products.

Suitable polymeric, polyfunctional hydrophilic amine compounds are polymers of an alkyleneimine having 2 to 4 carbon atoms, which have a molecular weight of 500 to 80,000, preferably of 10,000 to 40,000. These polymers possess, as a rule, a Brookfield viscosity at 20° C of 500 to 20,000 Centipoises (Cp). Polyalkyleneimines are, in particular, polyethyleneimines, polypropyleneimine, poly-1,2-butyleneimine and poly-2,3-butyleneimine. Of all the polyalkyleneimines, polyethyleneimine is preferably used.

Of particular practical interest as hydrophilic polymers are the polyamidopolyamines which are obtained by reaction of polyamines with polymeric carboxylic acids, and which can be further modified by addition of ethylene oxide or addition of epichlorohydrin. The polyamidepolyamines advantageously have an amine value in the range of about 200 to 650 mg of potassium hydroxide per gram of polyamideamine.

As polyamines which can be used for the preparation of the polyamidepolyamines, it is possible to use aromatic polyamines, or particularly aliphatic polyamines, which likewise can contain heterocyclic structures, such as, e.g. imidazolines.

Polymeric carboxylic acids, which advantageously are present in such polyamideamines, are obtained by polymerisation of one or more unsaturated, long-chain, aliphatic or aromatic-aliphatic acids, or esters thereof or other derivatives that are easily convertible into the acid. Suitable examples of such polymeric carboxylic acids are described in the British Patent Specifications Nos. 879,985 and 841,554.

In the case of the polymeric unsaturated carboxylic acids used here, these are advantageously aliphatic, ethylenic, unsaturated di- to trimeric fatty acids. Preferably, the polyamideamines are prepared from polyalkylenepolyamines and aliphatic ethylenic, unsaturated di- to trimeric fatty acids, which are derived from monocarboxylic acids having 16 to 22 carbon atoms. These monocarboxylic acids are fatty acids having at least one, preferably two to five, ethylenic unsaturated bonds. Representatives of this class of acids are, e.g. oleic acid, hiragonic acid, eleostearic acid, licanic acid, arachidonic acid, clupanodonic acid and, in particular linolic and linolenic acid. These fatty acids can be obtained from natural oils, wherein they are present, in particular, as glycerides.

The di- to trimeric fatty acids are obtained, in a known manner, by dimerisation of monocarboxylic acids of the stated kind. The so-called dimeric fatty acids always have a content of trimeric acids and a small content of monomeric acids.

Preferably employed polyfunctional hydrophilic polymers are albuminous substances, particularly scleroproteins such as gelatin or gelatinous products, for example, gelatin glue, glutine, tendon-collage, collage-decomposition products, albumins such as blood albumin, egg albumin, serum albumin, globulins, catalase, casein, fish glues such as isinglass glue as well as fish glues obtained from fish bones and fish gristle, protamines such as salmine and clupein; these polymers can be used as such or chemically modified, e.g. cross-linked with azetidinium compounds. The mentioned polymers contain both free amino groups and carboxyl groups. Thus, for example, in the case of gelatin and gelatinous products, the ε-amino group of the lysine, the amide group of an asparagine unit and/or the guanidine group of an arginine unit react with the carbonyl functions of the polyacrolein constituent. As long as the polymers are only difficultly water-soluble, as in the case of casein, solutions can be prepared in the presence of alkali, e.g. alkali metal hydroxides or alkali metal carbonates, or of tertiary amines, and can be used in this form. In the case of the system polyacrolein/albuminous substances, especially polyacrolein/gelatin, there are formed highly-cured but not brittle capsule materials.

Further hydrophilic compounds reacting with the carbonyl functions of the polyacrolein constituent are hydrophilic polymers with reactive amino groups, which can be used also in the form of water-soluble salts such as, e.g. hydrochlorides. These include, for example, polyvinylamine hydrochloride, poly-p-aminostyrene hydrochloride, polyacrylic amide and polymethacrylic amide, polyacrylic hydrazide and polymethacrylic hydrazide or polystyrene-p-sulphhydrazide. These polymers too can, under certan circumstances, be chemically further modified, e.g. with epichlorohydrin.

Polyfunctional hydrophilic compounds containing hydroxyl groups, which can be used according to the invention as cross-linking agents, are, for example, polyalcohols such as polyvinyl alcohol, polyallyl alcohol, also polyhydroxycarboxylic acids such as are obtainable, e.g. by Cannizzaro reaction from polyacroleins, also cellulose and partially etherified or esterified cellulose derivatives, as well as phenol-formaldehyde resins and the above-mentioned aminoplast precondensates having free hydroxyl and amino groups. In addition, polymeric silicic acids, such as water glass, can also be used.

The applied amounts of the substances required for the present process can vary within wide limits, depending on the purpose of application and on the requirements to be satisfied by the capsule material, as well as on the nature of the substances to be encapsulated. For the encapsulating of liquid substances, it has proved advantageous to use 33.5 to 335 parts by weight, preferably 67 to 200 parts by weight, of 15% aqueous polyacrolein-bisulphite solution to 100 parts by weight of liquid. This corresponds to a solid content of polyacrolein of 5 to 50 parts by weight, preferably 10 to 30 parts by weight, per 100 parts by weight of liquid to be encapsulated.

By a 15% polyacrolein-bisulphite solution is meant a solution containing 15 percent by weight of polyacrolein, exclusive of the amount of $SO_2$ necessary for the preparation of the solution, which amount is to be just sufficient for the obtainment of clear solutions. In general, this amount varies between 1 and 16 percent by weight of $SO_2$ in the solution. Preferably, however, it is between 2 and 10 percent by weight.

The amount of polyfunctional hydrophilic compound is advantageously likewise 5 to 50 parts by weight, preferably 10 to 30 parts by weight, to 100 parts by weight of liquid to be encapsulated. In the case of solid substances to be encapsulated, the lower limits of the applied amounts of the two constituents, i.e. of the polyacrolein constituent and of the hydrophilic polyfunctional compound, is, as a rule, somewhat higher than for liquids. To 100 parts by weight of solid substance, there are used, e.g. about 35 to 335 parts by weight, preferably 80 to 200 parts by weight, of the 15% polyacrolein-bisulphite solution, which corresponds to a solid content of polyacrolein of 6 to 50 parts by weight, preferably 12 to 30 parts by weight. The amount of hydrophilic polyfunctional compound varies between 6 and 50 parts by weight, preferably between 8 and 30 parts by weight, per 100 parts by weight of solid substance. The proportion of substance to be encapsulated with respect to the total mass of the capsule can be 50 to 95 percent by weight, preferably 60 to 90 percent by weight.

To effect encapsulation, the substrate intended as the content of the capsule is emulsified in the polyacrolein-bisulphite solution or polyacrolein-hydrate solution; the whole is diluted with water, and an aqueous solution of the hydrophilic polyfunctional compound, acting as a cross-linking agent, is subsequently added. Encapsulation is performed advantageously with $p_H$-values in the range of 2 to 10, preferably, however, with $p_H$-values of between 5 and 8. With the system polyacrolein(bisulphite)-gelatin, encapsulation is preferably performed in the $p_H$-range of 8 to 10, whereby in this case the polyacrolein-bisulphite solution is brought to the given $p_H$-value advantageously with triethylamine, and this solution is used preferably immediately for the preparation of the emulsion. The polyacrolein-bisulphite solutions usable according to the invention are stable at $p_H$-values of below 10 and up to 80° C. The reaction temperature is generally between 5 and 80° C. Encapsulation should preferably be performed at 20 to 60° C.

The polyacrolein-bisulphite solutions prepared with sulphur dioxide are, when stored in sealed containers, storage-stable for a practically unlimited length of time, and have, depending on the content of $SO_2$, a pH-value of between 1 and 4. Suitable for the adjustment of the $p_H$-values desired for encapsulation are, in particular, alkali metal hydroxides, alkali metal bicarbonates and alkali metal carbonates. In particular, however, there are used, inter alia, tertiary bases, e.g. tertiary amines, such as triethylamine, triethanolamine and pyridine.

The formaton of the capsule material occurs directly after the adding together of the polyacrolein-bisulphite substrate emulsion and the hydrophilic polyfunctional cross-linking constituent, with the sequence in which the two constituents are combined having no effect. The formation of the capsule is the result of a precipitation reaction in which the polyacrolein-bisulphite or polyacrolein-hydrate is reacted with the cross-linking constituent to form a polymeric compound that is insoluble in the external phase as in the internal phase. Insofar as the hydrophilic polyfunctional compound is likewise polymeric, there is formed, with co-crosslinking, a composite polymer forming the wall of the capsule. The cross-linking reaction can be catalysed by the addition of small amounts of aliphatic carboxylic acids having 1 to 6 carbon atoms, such as, e.g. formic acid, acetic acid, oxalic acid or citric acid. Also suitable are salts which produce an acid reaction when hydrolysis is performed.

The capsule material obtained as dispersion can optionally be post-cured or reinforced by subsequent encapsulating. For the additional post-curing, halogenated aliphatic carbonyl compounds having preferably 1 to 6 carbon atoms can be optionally used as curing agents. Suitable carbonyl compounds are, for example, monoaldehydes such as formaldehyde, acetaldehyde, propionaldehyde or acrolein, as well as dialdehydes such as glyoxal, methylglyoxal, glutardialdehyde and mucochloric acid.

Ketone compounds are likewise usable as curing agents, e.g. dihydroxy ketones such as dihydroxyacetone, 1,2- and 1,4-diketones such as cyclohexanedione-1,2, also quinones, trioxane, tetroxane, hexamethylenetetraamine, dianhydrides of tetracarboxylic acids, polyfunctional methanesulphonic acid esters, compounds with several reactive vinyl groups, such as vinylsulphones, acrylamides, compounds having at least two heterocyclic rings that can be readily split, such as ethyleneimine and ethylene oxide, as well as the azetidinium compounds described in the USA Patent Specification No. 3,634,399. The action of the stated low-molecular curing agents can be further enhanced by the addition of known curing accelerators, such as are described, e.g. in the German Patent Specification No. 837,955.

In addition to the above-mentioned low-molecular curing agents, it is also possible to use high-molecular curing agents, e.g. polyaldehydes such as the peroxyiodic acid oxidation products of starch, as well as metal salts such as chromium aluminium and zirconium salts. Curing with metal salts leads to a certain brittleness and reduced adhesiveness of the capsule materials.

The capsule material present in aqueous dispersion can, if desired, be after-reinforced. Suitable for this purpose are the aminoplast precondensates already mentioned above, particularly urea-formaldehyde condensates or melamine-formaldehyde condensates.

The preparation of such aminoplast precondensates is known and entails, for example, a process wherein 1 mole of urea or melamine is dissolve in such an amount of an aqueous, approximately 37%, formaldehyde solution that to 1 mole of urea there are 1.2 to 2 moles of formaldehyde, or to 1 mole of melamine about 3 to 6 moles of formaldehyde. The solutions obtained are optionally somewhat diluted with water and pre-condensed for a certain time at a pH value of above 8.0 and at slightly elevated temperature. The aminoplast pre-condensate solutions obtained in this manner are added to the polyacrolein-bisulphite emulsion or to the already pre-formed primary capsule suspension, whereby it is to be ensured that the dispersity of the suspension remains intact. Each capsule must be freely mobile, a state which is safely maintained by the addition of a sufficient amount of water. The resin covering is formed within a few hours with a $p_H$-value in the case of urea-formaldehyde of about 2.0, and in the case of melamine of between 4 and 6. Stirring during the process is as a rule unnecessary. The formation of resin can be accelerated by elevation of the temperature to 40° to 60° C. Isolation of the finished capsules is effected by filtration and drying or by spray drying or vacuum freeze drying. The dry capsules form a fine flowable powder.

Depending on the employed starting materials, especially the polyfunctional hydrophilic cross-linking constituent, it is possible to produce capsules impervious to gas or capsules having a microporous and hence pervious wall. In the latter case, the capsules are impervious to liquid but not to gas. Imperviousness to gas can be obtained by adding curing agents in the encapsulating process. By adjustment of the specific weight of the substance to be encapsulated, for example, by the addition of suitable solvents, there can be obtained microcapsules that do not settle out, which microcapsules can be of great importance for certain application purposes.

The resulting capsules can be dispensed in a liquid, pressed into tablet form or can be processed into the form of surface coatings or into some other form, in which forms the capsules are initially retained as such.

The capsules are as a rule colourless and have a long storage-life. Even temperatures of about 100° C have no harmful effect on the quality of the capsules, provided that the substances encapsulated are not sensitive to heat. The encapsulated substance can be released from the capsules in various ways. As a rule, this occurs mechanically by fracture of the wall of the capsule by the application of pressure thereon. Destruction of the capsule wall and hence the release of the contents can be effected also by shearing forces, friction, heat, supersonic waves or enzymes. Where the wall of the capsule has a microporous structure, the encapsulated substance can also be released by diffusion outwards.

The microcapsules produced by the process of the invention have as a rule a particle diameter of 1 to 500 $\mu$, preferably of 1 to 20 $\mu$. They are suitable, in particular, for the manufacture of heat-sensitive and pressure-sensitive copying papers and recording materials. For this purpose, solutions of colour-formers, optionally together with antioxidants and/or UV-absorbers, are encapsulated, and the capsules (capsule mass) are applied to the paper or are incorporated into the paper pulp. Capsules containing colour-former solutions can be applied, e.g. on the reverse side of a paper. The capsules are burst by means of pressure and the solution of colour-former is transferred pictorially to the upper side of a paper situated underneath, which paper is coated with a developer. This process is designated as the Chemical Transfer Process.

In the so-called Chemical-Self-Contained-Process the encapsulated colour-former and the developer are applied in one layer to the paper, so that the upper side of each sheet is permanently active. In the case of the so-called Monoform Papers, the capsules and the developer are incorporated together into the paper pulp. The developers used are, for example, acid reacting kaolins. Such papers coated with the capsules produced according to the invention are characterised by an excellent storage-stability. After storage of over 5 hours at 100° C, there are obtained copies unchanged in quality with sharp distinct outlines of the print.

Percentages in the following preparation instructions and examples relate to the weight.

Preparation of polyacrolein-bisulphite solutions

A. 328.4 g of polyacrolein (91.1% of polyacrolein, 8.9% of water) having a mean molecular weight of 24,500 and a reduced viscosity $\eta_{spec}/c = 0.203$(dl/g) determined according to R. C. Schulz, H. Cherdron, W. Kern Makrom. Chem. 24(1957)141, obtained by redox-polymerisation of acrolein with potassium persulphate ($K_2S_2O_8$) and silver nitrate ($A_8NO_3$), is suspended in 1671.6 g of distilled water, and dissolved in the course of 3 hours, with stirring, by the introduction of 110 g of sulphur dioxide gas. After filtration through a glass filter under reduced pressure, there is obtained a slightly yellow-coloured polyacrolein-bisulphite solution containing 16.35% of polyacrolein and 5.6% of sulphur dioxide.

B. 342 g of polyacrolein (87.7% of polyacrolein, 12.3% of water) having a mean molecular weight of 18,000 and a reduced viscosity $\eta_{spec}/c = 0.145$ (dl/g) determined according to R. C. Schulz, obtained by redox-polymerisation of acrolein, is suspended in 1658 ml of distilled water, and fully dissolved, with stirring on a vibromixer, by the introduction of $SO_2$-gas until a pasty consistency is obtained. After filtration through a glass filter under reduced pressure, there is obtained a solution containing, according to analytical determination, 13.9% of polyacrolein and 4.0% of $SO_2$.

C. 173 g of a polyacrolein obtained by redox polymerisation with potassium persulphate/silver nitrate, having a reduced viscosity determined according to Schulz et al. of $\eta_{spec}/c = 0.163$ (dl/g) (M 20 000), is dissolved in 1.4 litres of distilled water after the addition of 112 g of sodium hydrogen sulphite at 50° C with stirring. After filtration, 130 mg of $FeSO_4$ is added; sulphite is subsequently oxidised, by introduction of oxygen as stirring is maintained with a vibromixer, to sulphate. The pH-value is continuously maintained at between 5 and 6 by the addition of 1N sodium hydroxy solution. Oxidation is terminated when the pH-value remains constant for a considerable length of time. After adustment to pH 6.8, the solution obtained is concentrated and then dialysed (cellophane dialysing tube) to remove the neutral salts. The contents of the tube are afterwards concentrated to an analytically determined concentration of 11.6% of polyacrolein hydrate solution. The sulphur content of the solution is 0.1%.

The removal of the neutral salts can be dispensed with since they do not affect the formation of composite polymers during microencapsulation.

D. In a sulphonating flask, 18.2 g ($6.75 \cdot 10^{-2}$ mole) of potassium persulphate is dissolved in 2 litres of distilled and boiled water, and the air is then expelled by the introduction of nitrogen. There is introduced 100 ml (1.5 moles) of freshly distilled acrolein and 60 ml (0.91 mole) of acrylonitrile, and copolymerisation is performed at 20° C by the addition of a solution of 11.4 g ($6.70 \cdot 10^{-2}$ mole) of silver nitrate in 50 ml of distilled water. The precipitated copolymer is filtered off after 12 hours and washed with 2 litres of water; it is subsequently taken up in a solution of 5 g of sodium thiosulphate in 4 litres of water and stirring is maintained for 3 hours. After renewed filtration with suction and subsequent washing, the product is dried at 60° C in a vacuum chamber. There is obtained 113 g (85.4% of theory) of a colourless copolymer havinng a reduced viscosity of $\eta_{spec}/c = 0.256$ (dl/g), determined according to Schulz et al., and an analytically determined comonomer ratio of 64% of acrolein and 36% of acrylonitrile.

54 g of the acrolein/acrylonitrile copolymer is suspended in 1 liter of distilled water; 40 g of $NaHSO_3$ is added and the whole is stirred at 50° C. There is formed after 5 hours a clear, slightly yellow-coloured solution, which is concentrated to give an analytically determined content of 12.2% of copolymer. The sulphur content of the solution is 2.8%.

E. In a manner analogous to that described under D, 100 ml (1.50 moles) of freshly distilled acrolein and 100 ml (1.52 moles) of acrylonitrile are copolymerised with 9.1 g ($3.36 \cdot 10^{-2}$ mole) of potassium persulphate and 5.7 g ($3.35 \cdot 10^{-2}$ mole) of silver nitrate in 2 liters of distilled and boiled out water at 20° C. The resulting copolymer (143 g; 87% of theory) contains acrolein and acrylonitrile in the ratio of 50% in each case. The reduced viscosity $\eta_{spec}/c$, determined according to Schulz et al., is 0.70 (dl/g).

54 g of this acrolein/acrylonitrile copolymer is stirred at 50° C in 1 liter of distilled water after the addition of 36 g of NaHSO$_3$, until a clear slightly yellow-coloured solution is formed. After filtration, the solution is concentrated to give an analytically determined content of 12.6% of copolymer. The sulphur content of the solution is 2.6%.

F. Analogously to D, 100 ml (1.50 moles) of freshly distilled acrolein and 60 ml (0.91 mole) of acrylonitrile are copolymerised at 20° C with 9.1 g (3.36·10$^{-2}$ mole) of potassium persulphate and 5.7 g (3.35·10$^{-2}$ mole) of silver nitrate. The resulting copolymer (115 g; 87% of theory) has an analytically determined comonomer ratio of about 64% of acrolein and 37% of acrylonitrile, and a reduced viscosity of $\eta_{spec}/c = 0.313$ (dl/g).

54 g of this acrolein/acrylonitrile copolymer is fully dissolved in 1 liter of distilled water at 50° C, with stirring, after the addition of 28 g of NaHSO$_3$; and the solution is subsequently concentrated to give an analytically determined content of 10.7% of copolymer.

G. 54 g of the acrolein/acrylonitrile copolymer described under D ($\eta_{spec}/c = 0.256$ (dl/g)) is dissolved in 1 liter of distilled water at 50° C, with stirring, after the addition 24 g of NaHSO$_3$. After filtration, and addition is made of 50 mg of FeSO$_4$ as oxidation catalyst, and a solution is prepared, as described under C, by the introduction of oxygen; after dialysis and concentration, the solution has an analytically determined content of 13.9% of acrolein hydrate/acrylonitrile copolymer and 0.15% of sulphur.

EXAMPLE 1

50 g of the polyacrolein-bisulphite solution obtained by the preparation procedure A is brought to pH-value of 6.5 with 5% aqueous sodium hydroxide solution. There is then stirred in to form an emulsion, by means of a high-speed stirrer, 50 g of an insecticidal mixture consisting of 25 g of a compound of the formula

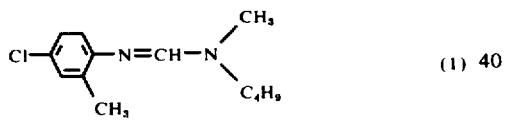

(1)

and 25 g of paraffin. With continuous stirring, the emulsion is diluted with 500 ml of distilled water and an addition is made of 500 g of a 1.2% gelatin solution. The resulting dispersion is transferred to another vessel; it is further stirred and 8 ml of 37% aqueous formaldehyde solution is added. The pH-value is adjusted to 6.0 by the addition of glacial acetic acid. The reaction mixture is thereupon heated to 60° C, and cured for 24 hours at this temperature. After the addition of 0.25 g of sodium lauryl sulphate, the capsule mixture (mass) is isolated by spray drying at an inlet temperature of 120° C and an outlet temperature of 50° C. There is obtained a colourless powder which can be readily dispersed in water. The capsule material dispersed in water does not settle out. 95% of the capsule material has a particle size of 1–10 $\mu$: the main proportion is within the range of size of between 1 and 5 $\mu$. The capsule material consists to the extent of 95% of particles having a density of <1.0(gcm$^{-3}$) and to the extent of 80% of particles having a density of >0.96(gcm$^{-3}$).

EXAMPLE 2

114.5 g of the polyacrolein-bisulphite solution prepared according to A is brought to a pH-value of 6.5 with 5% sodium hydroxide solution. There is then stirred in to form an emulsion, with a high-speed stirrer, 100 g of a 4% colour-former solution, obtained by the dissolving of 18 g of crystal-violet lactone and 12 g of benzoyl-leucomethylene blue in 360 g of chlorinated diphenyl and 360 g of paraffin oil. The emulsion is diluted with 1000 ml of water, and the pH-value thereof is adjusted, while stirring is maintained, with 1000 of a 1.5% edible gelatin solution. The capsule mixture obtained is then heated to 40° C; it is held for one hour at this temperature, and an addition is thereupon made of 8 ml of a 24–26% glutardialdehyde solution and 6 ml of 37% formaldehyde solution. After a curing time of 24 hours, the capsule material is isolated by spray drying. There is obtained 119 g of a colourless, finely pulverulent capsule material, which is usable for pressure-sensitive copying paper and which exhibits an excellent duplicating effect. An ageing test at 105° C produces after 24 hours a capsule material displaying an unchanged copying effect.

EXAMPLE 3

57.3 g of the polyacrolein-bisulphite solution prepared according to A is brought to a pH-value of 6.5 with 5% sodium hydroxide solution. There is then stirred in to obtain an emulsion, with the aid of a high-speed stirrer, 50 g of a 4% dyestuff solution - 40 g of 3-methyl-2,2-spiro-di(benzo)-chromen dissolved in 960 g of partially hydrogenated terphenyls (M.P. 340° to 396° C). After dilution of the emulsion with 500 ml of water, there is added 500 g of a 1.5% edible-gelation solution; there then occurs by virtue of the precipitation of a composite polymer the formation of capsules. The capsule suspension is heated, with stirring, to 40° C and is held at this temperature for 1 hour; an addition is then made of 10 g of 37% formaldehyde solution, and curing is performed at a pH-value of 8 for 12 hours. The capsule mixture (mass) is subsequently brought to pH-value of 5 with acetic acid and then spray dried. There is obtained 60.5 g of dyestuff capsules having a good copying effect when used in pressure-sensitive copying material. An ageing test of 24 hours at 105° C leaves an unchanged copying effect of the capsules.

EXAMPLE 4

57.3 g of the polyacrolein-bisulphite solution prepared according to A is adjusted with 5% sodium hydroxide solution to have a pH-value of 6.5. There is then stirred in to form an emulsion 50 g of a mixture consisting of 0.5 g of 4,2',4'-trichloro-2-hydroxy-diphenyl ether and 49.5 g of ethyl oleate. The emulsion is diluted with 500 ml of water; a solution of 70 g of edible gelatin in 430 g of water is added and, with stirring, the pH-value is adjusted to 6 with 5% sodium hydroxide solution. Immediately after addition of the gelatin solution, there commences, with precipitation of a polymeric compound, the formation of capsule walls. The capsule mixture is heated to 60° C, 8 ml of 37% formaldehyde solution is added and curing is performed for 16 hours. After cooling to room temperature, the capsule material is spray dried. There is obtained 61 g of encapsulated antimicrobic agent.

EXAMPLE 5

59.7 of the polyacrolein-bisulphite solution prepared according to A is brought to a pH-value of 6.5 with 5% sodium hydroxide solution. There is then stirred in to form an emulsion, with the aid of a high-speed stirrer, 50 g of an insecticidal mixture of the composition given in Example 1. After dilution of the emulsion with 500 ml of water, there is added, with further stirring, a solution of 37.5 g of a water-soluble diethylenetriamine/adipic acid/epichlorohydrin reaction product according to the British Patent Specification No. 865,727 in 500 ml of water, and the pH-value is adusted to 6 with acetic acid, whereupon a capsule formation occurs. The capsule suspension is heated to 60° C, 20 ml of a 30% formaldehyde solution is added and curing is performed for 24 hours. After filtration, washing with 500 ml of water and drying in air, there is obtained 62 g of capsule material. This has good perviousness and exhibits with respect to the encapsulated active substance a retarded release effect.

EXAMPLE 6

50 g of the polyacrolein-bisulphite solution prepared according to A is brought to a pH-value of 7 with 5% sodium hydroxide solution. There is then stirred in to form an emulsion, by means of a high-speed stirrer, 50 g of an insecticide mixture of the composition given in Example 1, and the emulsion is subsequently diluted with 500 ml of water. There is then added, with further stirring, a solution, adjusted with acetic acid to pH 6.5, consisting of 7 g of diethylenetetramine in 500 ml of water, whereupon the capsule material precipitates. After 30 minutes, there is added 30 g of 37% formaldehyde solution, and the reaction mixture is maintained at 60° C for 24 hours. After filtration, subsequent washing with 500 ml of water and drying in air, there is obtained 63 g of a lemon yellow capsule material (having a porous capsule wall and retarded release effect for the encapsulated active substance).

EXAMPLE 7

50 g of the polyacrolein-bisulphite solution prepared according to A is adjusted with 5% sodium hydroxide solution to have a pH-value of 6.4. There is then stirred in to form an emulsion, by means of a high-speed stirrer, 50 g of an insecticide mixture of the composition given in Example 1; and the emulsion is subsequently diluted with 500 ml of water. An addition is made thereto of 100 g of a 9% solution of a condensation product from 42 g of dicyanodiamide, 121.6 g of 30% formaldehyde solution and 25.8 g of diethylenetriamine in 937 g of water; and the pH-value is adjusted to 6.0 with acetic acid. Capsule formation occurs as a result of precipitation of a polymeric compound. The reaction mixture is held at 60° C for 18 hours; the capsule material is filtered off, washed with 1000 ml of water and dried in air. There is obtained 63 g of microencapsulated insecticide. The capsule material is microporous; the contents of the capsule have a retarded release.

EXAMPLE 8

113.3 g of the polyacrolein-bisulphite solution prepared according to A is adjusted with 10% sodium hydroxide solution to have a pH-value of 6.5. There is then stirred in to form an emulsion, by means of a high-speed stirrer, 100 g of a mixture consisting of 130.2 g of an insecticide of the formula given in Example 1 and 119.8 g of paraffin; and the emulsion is subsequently diluted with 1000 ml of water. There is then added, with further stirring, a solution, adjusted to have a pH-value of 6.5, consisting of 5 g of a polyethyleneimine having a viscosity of 20° C of 10,000 – 20,000 cP in 1000 ml of water, whereupon capsules are formed as a result of precipitation of a composite polymer. An addition is subsequently made of a precondensate from 30 g of melamine and 62 g of 37% formaldehyde solution, and the whole is further condensed at 60° C. The reaction mixture is held at 60° C for 20 hours, and then cooled to room temperature. The capsule material is afterwards filtered off, washed with 1000 ml of water and finally dried at 40° C. There is obtained 158 g of a lemon coloured, readily agglomerated capsule material.

EXAMPLE 9

114.5 g of a polyacrolein-bisulphite solution obtained according to A is brought with 10% sodium hydroxide solution to a pH-value of 6.5. There is then stirred in to form an emulsion, by means of a high-speed stirrer, 100 g of a mixture consisting of 312.5 g of an insecticide of the formula given in Example 1 and 187.5 g of paraffin; and the emulsion is subsequently diluted with 1000 ml of water. An addition is then made, with further stirring, of a solution of 51.5 g of melamine-formaldehyde precondensate in 1000 ml of water at 60° C, and the pH-value of the reaction mixture is adjusted to 6.5 with glacial acetic acid. After 20 hours' curing at 60° C, the resulting capsule material is filtered off, washed with 1000 ml of water and dried at 40° C in a light stream of air. There is obtained 152.6 g of a capsule material having good chemical stability.

EXAMPLE 10

65 g of the polyacrolein-bisulphite solution obtained according to preparation procedure B is brought to a pH-value of 8.0 with triethylamine. There is then stirred in to form an emulsion, with the aid of a high-speed stirrer, 50 g of an insecticidal mixture of the composition given in Example 1. The emulsion is diluted with 600 ml of water, and an addition is then made, with stirring, of a solution of 7.0 g of edible gelatin in 450 g of water, the solution having been previously adjusted with triethylamine to have a pH-value likewise of 8. With further stirring, the dispersion is heated to 60° C; 8 ml of 37% aqueous formaldehyde solution is added and curing is performed at 60° C for 22 hours, whereby the pH-value is maintained at 8 by the addition of 5% sodium hydroxide solution. After spray-drying at an inlet temperature of 150° C and an outlet temperature of 75°–80° C, 64 g of a colourless loose capsule material having particle size of between 1 and 6 μ is obtained.

EXAMPLE 11

49 g of the polyacrolein-bisulphite solution obtained according to procedure A is brought to pH 5.4 with 5% aqueous sodium hydroxide solution; there is then added and emulsified, by means of a high-speed stirrer, 50 g of insecticidal mixture consisting of 25 g of the compound of formula (1) (96%) and 25 g of paraffin oil. After dilution of the emulsion with 600 ml of distilled water, a solution of 8 g of edible gelatin in 392 ml of distilled water is added, and the whole is stirred at 40° C for one hour. The pH-value is subsequently adjusted to 7.5 with 5% aqueous sodium hydroxide solution, and curing is performed at this pH-value for 22 hours. After spray-drying of the reaction product, there is obtained 62 g of a freely flowing capsule material having a particle size in the range of 1 to 5 μ.

EXAMPLE 12

The procedure as in Example 11 is carried out, with the difference, however, that there is used, instead of the insecticidal mixture, a colour-former solution consisting of 25 g of chlorinated biphenyl, 25 g of paraffin oil, 1.2 g of crystal violet lactone and 0.8 g of benzoyl-leucomethylene blue. After spray-drying of the reaction product, there is obtained 63.5 g of a capsule material having separate microcapsules, the diameter of which is in the range of 2 to 10 $\mu$. The capsule material thus obtained can be used for duplicating and copying papers.

EXAMPLE 13

57.3 g of the polyacrolein-bisulphite solution obtained according to A is brought to pH 7.5 with triethylamine. There is then added and emulsified, by means of a high-speed stirrer, 50 g of a 4% colour-former solution - 40 g of 3-methyl-2,2-spiro-di-(benz)-chromeno dissolved in 960 g of partially hydrogenated terphenyls (M.P.: 340° to 396° C), until a droplet size of about 1 to 5 $\mu$ is obtained, and the whole is subsequently diluted with 400 ml of water.

10 g of casein are dissolved, after 12 hours' swelling, in 70 ml of water at 50° C with the addition of triethylamine. When the solution contains no further gel particles, it is diluted with 500 ml of water at 50° C. There is then poured in, with stirring, the above-described emulsion, and curing is performed at 50° C for 22 hours, with the pH-value of the dispersion being maintained at 7.5. After spray-drying at an inlet temperature of 150° C, there is obtained 67 g of dyestuff capsules having a capsule diameter of 2 to 10 $\mu$ for use in pressure-sensitive copying material.

EXAMPLE 14

60 g of a dyestuff solution of the composition given in Example 2 is emulsified, with the aid of a high-speed stirrer, in 100 g of the acrolein-acrylonitrile copolymer bisulphite solution, and the emulsion is subsequently diluted with 700 ml of water. There is then added, at room temperature, 180 g of a 5% aqueous solution of polyacrylic hydrazide (prepared by reaction of polyacrylic acid ethyl ester (= 0.18 (dl/g); M = 30 000) with hydrazine according to Kern and Schulz, Angew. Chem. 69, (5) (1957) 155); the pH-value is adjusted to 7 with 1N sodium hydroxide solution, and the mixture is cured, with stirring on the vibromixer, for 12 hours. Spray-drying at 120° C inlet temperature and 50° C outlet temperature yields 79 g of a capsule material consisting of separate microcapsules having a particle diameter of between 1 and 10 $\mu$.

EXAMPLE 15

60 g of a dyestuff solution of the composition given in Example 2 is emulsified, with the aid of a high-speed stirrer, in 100 g of the acrolein/acrylonitrile copolymer bisulphite solution described under F, and the emulsion is then diluted with 700 ml of water. A solution of 8 g of edible gelatin in 152 ml of water is thereupon added to the said emulsion as this is vibrated on a vibromixer, and the pH-value is adjusted to 7.5 with 1N sodium hydroxide solution; this pH-value is subsequently maintained, by a further addition of sodium hydroxide solution, in the course of 12 hours' curing at room temperature. The capsule dispersion obtained is spray dried at an inlet temperature of 125° C and an outlet temperature of 65° C; there is thus obtained 74.5 g of a preparation consisting of separate microcapsules (particle diameter between 1 and 10 $\mu$).

EXAMPLE 16

60 g of dyestuff solution of the composition given in Example 2 is emulsified in 100 g of the acrolein/acrylonitrile copolymer bisulphite solution described under E; the emulsion is then diluted with 700 ml of water. An addition is subsequently made, with stirring on a vibromixer, of a solution of 8 g of casein in 152 ml of water to which has been added a few drops of triethylamine, and curing is performed for 12 hours at 50° C with a pH-value of 7.5. After spray drying under the conditions stated in Example 15, there is obtained 76 g of a preparation consisting of separate microcapsules (particle diameter between 1 and 8 $\mu$).

EXAMPLE 17

60 g of dyestuff solution of the composition given in Example 2 is emulsified, with the aid of a high-speed stirrer, in 100 g of the acrolein hydrate/acrylonitrile copolymer solution described under G, and the emulsion is diluted with 500 ml of water; an addition is subsequently made, with stirring on a vibromixer, of a solution of 10 g of polyvinyl alcohol (M = 22 000) in 100 ml of water. The pH-value is adjusted to 3 with 1N hydrochloric acid; curing is performed at 40° C for 1 hour, and the material is subsequently spray dried under the conditions given in Example 15 to obtain 77.5 g of a preparation consisting of separate microcapsules (particle diameter between 1 and 15 $\mu$).

EXAMPLE 18

60 g of a dyestuff solution of the composition given in Example 2 is emulsified, with the aid of a high-speed stirrer, in 100 g of polyacrolein hydrate solution (solution C); the emulsion is subsequently diluted with 700 ml of water. With further stirring on the vibromixer, the temperature is raised to 60° C, and 160 g of the 5% polyacrylic hydrazide solution mentioned in Example 4 is then added. After adjustment of the pH to 7.0 with 1N sodium hydroxide solution, spray drying is carried out after curing time of 15 hours (inlet temperature: 125° C; outlet temperature: 60° C). There is obtained 72 g of a light-yellow capsule preparation consisting of separate microcapsules (particle diameter 1 - 15 $\mu$).

EXAMPLE 19

60 g of dyestuff solution of the composition given in Example 2 is emulsified, by means of a high-speed stirrer, in 100 g of polyacrolein hydrate solution (solution C); the emulsion is then diluted with 700 ml of water. After heating of the mixture to 60° C, there is added, with continued stirring on the vibromixer, 225 g of a 4% aqueous fish glue solution (isinglass glue), and the pH-value is adjusted to 7.5 with 1N sodium hydroxide solution, and is maintained at this value during the whole of the curing treatment (15 hours). Spray drying is then carried out under the conditions given in the previous example. There is obtained 76.5 g of a capsule preparation consisting of separate microcapsules (particle diameter 1 - 10 $\mu$).

EXAMPLE 20

60 g of Santosol 340 (HB 40) is emulsified, with the aid of a high-speed stirrer, in 100 g of polyacrolein hydrate solution C; the emulsion is subsequently diluted with 700 ml of water. An addition is then made at room temperature, with further stirring on the vibromixer, of 200 g of a 9% aqueous sodium silicate solution (water glass), the pH-value of which has previously been set back to 8 with 1N hydrochloric acid; a further addition of hydrochloric acid is then made to the emulsion to bring the pH-value thereof to 4. After about 15 hours, there are formed stable separate micro-capsules, which can be isolated by spray drying at an inlet temperature of 130° C and an outlet temperature of 65° C to give a yield of 83.5 g. The particle diameter of the capsules is between 1 and 15 $\mu$.

EXAMPLE 21

60 g of a dyestuff solution of the composition given in Example 2 is emulsified, with the aid of a high-speed stirrer, in 100 g of polyacrolein hydrate solution C; the emulsion is subsequently diluted with 500 ml of water. There is then added to the emulsion heated to 70° C, with further stirring on the vibromixer, 120 g of a 10% aqueous polyvinyl alcohol solution (M = 22 000), and the pH-value is adjusted to 3 with 1N hydrochloric acid. After 1 hour's pre-curing, spray drying is carried out at an inlet temperature of 130° C and an outlet temperature of 60° C to obtain 77.5 g of a preparation consisting of microcapsules having a particle diameter of between 1 and 15 $\mu$.

EXAMPLE 22

35 g of polyacrolein hydrate solution C and 160 g of 9.6% polyvinyl alcohol solution (M = 22 000) are homogeneously mixed together; there is then stirred in to form an emulsion, with the aid of a high-speed stirrer, 50 g of a 4% solution of 3-methyl-2,2-spiro-di(benzo)-chromeno in Santosol 340 (HB 40), and the emulsion is diluted with 500 ml of water. The pH-value is adjusted to 4 by the addition of 2N sulphuric acid; pre-curing is performed for 1 hour, with stirring on the vibromixer, and the product is then spray dried at an inlet temperature of 130° C and an outlet temperature of 60° C to obtain 63 g of a capsule preparation (particle diameter 1 – 15 $\mu$)

A duplicating paper coated with the capsule dispersion and then dried exhibits after 5 hours' ageing at 100° C a practically unchanged copying capacity.

What we claim is:

1. A process for the encapsulating of substances immiscible with water, wherein the substance to be encapsulated is dispersed in a distribution medium in the presence of an aqueous solution of a polyacrolein or acrolein copolymer present as hydrate or bisulphite adduct, which aqueous solution is capable of forming a compound insoluble in the distribution medium; and the hydrate or the bisulphite adduct is reacted in the resulting dispersion with an alkyleneamine having 2 to 5 amino groups, which are separated by straight-chain or branched-chain alkylene groups having 2 to 6 carbon atoms to form an insoluble capsule material.

2. A process for the encapsulating of substances immiscible with water, wherein the substance to be encapsulated is dispersed in a distribution medium in the presence of an aqueous solution of a polyacrolein or acrolein copolymer present as hydrate of bisulphite adduct, which aqueous solution is capable of forming a compound insoluble in the distribution medium; and the hydrate or the bisulphite adduct is reacted in the resulting dispersion with a polyalkyleneimine having a mean molecular weight of between 500 and 80000 to form an insoluble capsule material.

3. A process for the encapsulating of substances immiscible with water, wherein the substance to be encapsulated is dispersed in a distribution medium in the presence of an aqueous solution of a polyacrolein or acrolein copolymer present as hydrate or bisulphite adduct, which aqueous solution is capable of forming a compound insoluble in the distribution medium; and the hydrate or the bisulphite adduct is reacted in the resulting dispersion with a water-soluble basic aminoplast to form an insoluble capsule material.

4. A process for the encapsulating of substances immiscible with water, wherein the substance to be encapsulated is dispersed in a distribution medium in the presence of an aqueous solution of a polyacrolein or acrolein copolymer present as hydrate or bisulphite adduct, which aqueous solution is capable of forming a compound insoluble in the distribution medium; and the hydrate or the bisulphite adduct is reacted in the resulting dispersion with a polyamideamine obtained by polycondensation of polymeric carboxylic acid with polyamines to form an insoluble capsule material.

5. A process according to claim 4, wherein the polyamideamine has an amine value in the range of 200–650 mg. of potassium hydroxide per gram of polyamideamine.

* * * * *